July 10, 1945.  E. L. SCHWARZ  2,380,268
MOTOR CONTROL
Filed Jan. 10, 1942  2 Sheets-Sheet 2
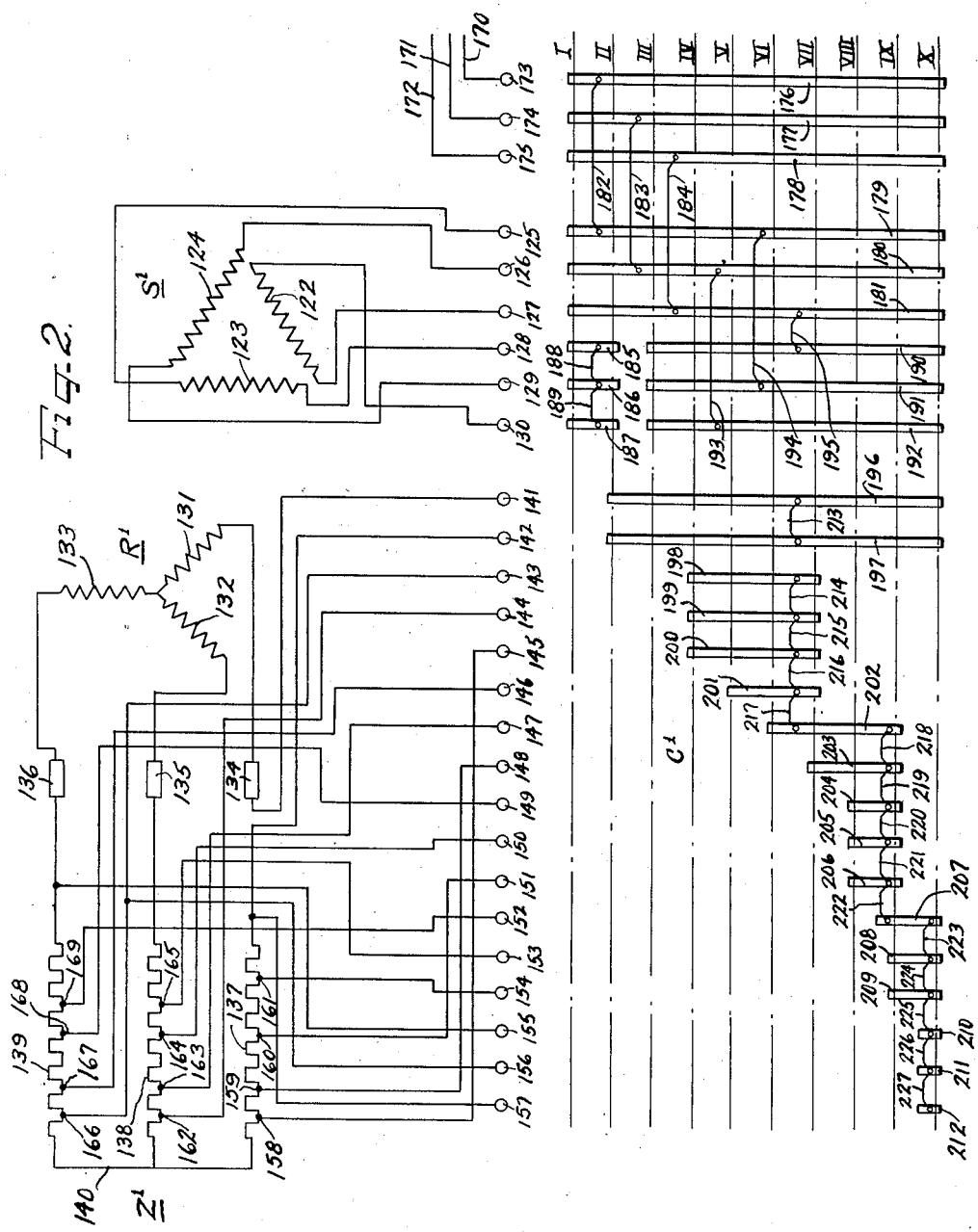
Inventor
ERNST L. SCHWARZ
by Attys.

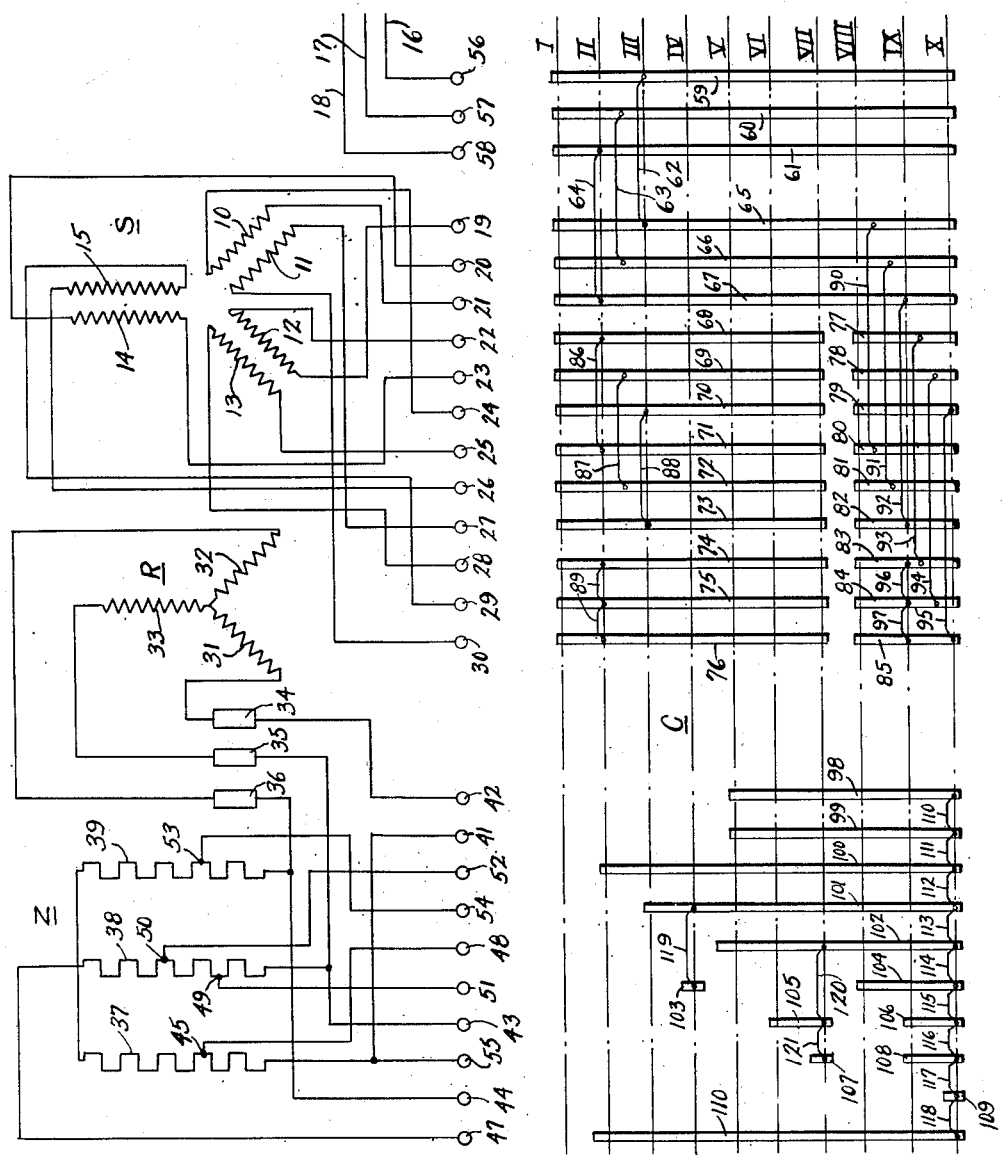

Patented July 10, 1945

2,380,268

UNITED STATES PATENT OFFICE 2,380,268

MOTOR CONTROL

Ernst L. Schwarz, Chicago, Ill., assignor to Armour Research Foundation, Chicago, Ill., a corporation of Illinois Application January 10, 1942, Serial No. 426,277

1 Claim. (Cl. 172—274)

This invention relates to an electric motor speed controlling system, and more particularly to a speed controlling system for a three phase induction motor of the wound rotor type.

The present invention relates primarily to motors which are employed for driving large fans, or other loads, arranged to run at different speeds, and which have the characteristic that the torque required decreases faster than the square of the speed reduction. Motors for driving fans should be capable of operating over a wide range of speeds without having too great a difference between the torque developed and the torque required. The reason for this is that it is difficult to obtain low speed without great loss of efficiency when the speed is controlled by a variable resistance means in the rotor circuit.

One of the important features and objects of the present invention is to provide a three phase induction motor of the wound rotor type in which provision is made for varying the rotor resistance and simultaneously varying the connection of the two part windings of each phase of the stator in accordance with a predetermined schedule.

It is old in the art to provide switching means to connect the two part windings of each phase of the stator, either in parallel or in series, but these have always been employed in a constant speed motor or as a starting means to bring the motor up to speed. The prior art has not provided any system, however, in which the part windings of the stator have their connections changed and at the same time causing a change in the resistance in the wound rotor. By making this simultaneous change in accordance with a predetermined schedule, an extremely efficient speed control can be obtained for a three phase induction motor which is employed for driving a fan, or other load which has the above mentioned characteristics.

It is an object of the present invention to provide an electric motor speed controlling system having the above referred to characteristics.

It is a further object of the present invention to provide a three phase induction motor of the type having two part windings in each phase of the stator and a wound rotor with switching and control means for simultaneously changing the electrical connections of the part windings of the stator and the resistance of the rotor.

Another object of the present invention is to provide a novel method and means of controlling the speed of an alternating current electric machine.

The novel features which I believe to be characteristic of my invention are set forth with particularity in the appended claim. My invention itself, however, both as to its organization, manner of construction, and method of operation, together with further objects and advantages thereof, may best be understood by reference to the following description taken in connection with the accompanying drawings, in which:

Figure 1 is a schematic wiring diagram of an electric control system for a three phase wound rotor induction motor embodying the novel features of the present invention; and Figure 2 is a schematic wiring diagram showing a second embodiment of my invention.

In Figure 1 of the drawings, I have illustrated a three phase wound rotary induction motor having a stator S and a rotor R. The stator S is a three phase stator with two part windings in each phase, as is indicated at 10, 11, 12, 13, 14 and 15. These six windings are arranged to be connected in a wide variety of manners to a three phase source of power supplied through conductors 16, 17 and 18. Each end of each of the stator windings 10 to 15, inclusive, are connected to contactor shoes 19 to 30, inclusive. As is clearly shown in Figure 1 of the drawings, the outer ends of the windings 10, 11, 12, 13, 14 and 15 are connected to contactor shoes 21, 27, 19, 25, 20 and 26, respectively, while the inner ends of these same windings are connected to contactor shoes 24, 30, 22, 28, 23 and 29, respectively.

The rotor R is shown as comprising three windings 31, 32 and 33, connected in star. It is to be understood, however, that the rotor windings may be connected in any other manner, such as connected in delta, without departing from the spirit and scope of the present invention. The rotor is connected through slip rings 34, 35 and 36 to a resistance unit Z. This resistance unit Z has three resistance elements 37, 38, and 39, which are connected together at one end by conductor 40. Resistance elements 38 and 39 are connected as shown for engagement with slip rings 35 and 36. Resistance element 37, however, is connected to a contactor shoe 41 of the controller C, while slip ring 34 is connected through a suitable sliding shoe (not shown) to contactor shoe 42 of controller C. The slip ring ends of resistance elements 38 and 39 are connected to contactor shoes 43 and 44, respectively. An intermediate point 45, on resistance element 37, is connected to contactor shoe 48, respectively, on controller C. Two intermediate points 49 and 50 on resistance element 38 are connected to contactor shoes 51 and 52 on controller C. One intermediate point 53 on resistance element 39 is connected to contactor shoe 54 on controller C. The slip ring end of resistance element 37, in addition to being connected to contactor shoe 41, is also connected to a contactor shoe 55, as shown. The connected ends of resistance elements 37, 38 and 39 are connected as at 46 to contactor shoe 47 on controller C.

The three phase power supply lines 16, 17, 18, have their respective individual conductors connected to contactor shoes 56, 57 and 58, on controller C.

The controller C may be of any suitable variety well known to those skilled in the art, such as a cylindrical controller, or a flat sliding plate type controller, in which a series of contactor bars are mounted and arranged to be engaged by one or more of the sliding contactor shoes through a series of different positions. The controller C as shown, is a controller having ten positions as indicated by the broken lines, and whose positions are indicated by the Roman numerals. Three contactor bars 59, 60 and 61 are provided on the controller C for progressive engagement with the contactor shoes 56, 57 and 58, respectively. It will be observed that the contactor bars 59 to 61 extend across all ten positions of the controller C. The contactor bars 59, 60 and 61 are electrically connected by cross connections 62, 63 and 64, to the contactor bars 65, 66 and 67, which also extend across all ten positions of the controller C. The contactor bars 65, 66 and 67 are arranged to be engaged by the contactor shoes 19, 20 and 21 in all ten positions of the controller C and thus for all ten operating positions of the controller C, power is supplied through the contactor shoes 19, 20 and 21 to the outer end of winding 12, the outer end of winding 14 and the outer end of winding 10.

Two groups of contactor bars are provided for contactor shoes 22 to 30, inclusive. The first group of contactor bars 68 to 76 extend across the first five positions of the controller C, and they are arranged to be engaged by contactor shoes 22 to 30, respectively. The second group of contactor bars 77 to 85 are also arranged to be engaged by contactor shoes 22 to 30, respectively, and extend across the last five positions of the controller C, or more particularly, extend across positions VI to X.

The contactor bars 68 to 76 are connected in such a manner as to cause the two part windings in each phase of the stator S to be connected in series, and at the same time the phases are connected in star. This is accomplished by connecting contactor bar 68 with contactor bar 71 as at 86; contactor bar 69 with 73 as at 87; contactor bar 70 with 73 as at 88; and, contactor bars 74, 75 and 76 together as at 89.

The part windings 10 to 15 in the stator S are arranged to be connected in parallel in each phase by the contactor bars 77 to 85. For this purpose contactor bar 80 is connected to contactor bar 65 through the cross connection 90; contactor bar 81 is connected to bar 66 through the cross connection 91; contactor bar 82 is connected to bar 67 through cross connection 92; contactor bar 83 is connected to bar 77 through cross connection 93; contactor bar 84 is connected to bar 78 through cross connection 94; contactor bar 85 is connected to bar 79 through cross connection 95; and, contactor bars 85, 84 and 83 are also connected to each other through cross connections 96 and 97.

The rotor R is arranged for operation as a three phase rotor and also as a single phase rotor by opening one phase. Contactor bars 98 and 99 on controller C extend across positions V to X and determine whether the rotor is to operate as a single phase rotor or as a three phase rotor. More particularly, the contactor bars 98 and 99 are arranged to be engaged by the contactor shoes 42 and 41, respectively, when the controller C is in any one of its last six positions.

The remaining contactor bars 100 to 108 on the controller C are arranged to connect varying amounts of resistance into the rotor circuit. Contactor bar 100 extends across positions II to X, inclusive; contactor bar 101 extends across positions III to X, inclusive; contactor bar 102 extends across positions V to X, inclusive; contactor bar 103 extends across position IV only; contactor bar 104, which is arranged to be engaged by the same contactor shoe, namely, contactor shoe 51, as is contactor bar 103, extends across positions VIII to X, inclusive; contactor bar 105 extends across positions VI and VII; contactor bar 106 extends across positions IX and X, and is arranged to be engaged by the same contactor shoe 43 as bar 105; contactor bar 107 extends across position VII only; contactor bar 108 extends across positions IX and X, and is arranged to be engaged by the same contactor shoe 55 as bar 107; contactor bar 109 extends across position X only; and contactor bar 110 extends across positions II to X, inclusive.

Contactor bars 98, 99, 100, 101, 102, 104, 106, 108, 109 and 110 are all interconnected by the cross connections 100, 111, 112, 113, 114, 115, 116, 117, and 118.

Contactor bar 103 is connected to contactor bar 101 by a cross connection 119. Contactor bars 102, 105 and 107 are connected together by cross connections 120 and 121.

By moving controller C through its range of positions, a wide variety of motor speeds may be obtained with less power and greater efficiency than anything heretofore known by me.

For purposes of illustration and by way of example, a table is given below for a motor arrangement of the above described type, but in which a larger number of rotor resistance steps were used than is shown in the illustrated embodiment. More specifically, on the resistance Z, and for purposes of simplicity, the drawings illustrate a current in which some of the steps on the rotor resistance unit were eliminated to avoid an excessive number of lines on the drawings. The circuit of the drawings employs resistor steps 1, 5, 8, 9, 10, 11, 12 and 13 of the table which is now given by way of example:

Table

| Resistor steps | I. | | | II. | | | III. | | |
|---|---|---|---|---|---|---|---|---|---|
| | Part windings in parallel | | | Part windings in series | | | | | |
| | Three rotor phases connected | | | Three rotor phases connected | | | One rotor phase disconnected | | |
| | R. P. M. | Watts | P. F. | R. P. M. | Watts | P. F. | R. P. M. | Watts | P. F. |
| 1 | 530 | 800 | .35 | 260 | 240 | .44 | 164 | 200 | .44 |
| 2 | 560 | 800 | .35 | 270 | 280 | .52 | 174 | 200 | .44 |
| 3 | 590 | 900 | .39 | 330 | 320 | .55 | 213 | 220 | .46 |
| 4 | 635 | 1,000 | .42 | 360 | 360 | .60 | 240 | 240 | .48 |
| 5 | 685 | 1,100 | .45 | 400 | 420 | .65 | 270 | 270 | .52 |
| 6 | 730 | 1,200 | .48 | 450 | 480 | .68 | 310 | 300 | .54 |
| 7 | 790 | 1,300 | .50 | 500 | 580 | .72 | 360 | 360 | .58 |
| 8 | 850 | 1,400 | .53 | 545 | 640 | .76 | 400 | 400 | .61 |
| 9 | 890 | 1,600 | .57 | 590 | 740 | .77 | 445 | 440 | .59 |
| 10 | 940 | 1,700 | .59 | 650 | 860 | .80 | 500 | 490 | .59 |
| 11 | 1,005 | 1,900 | .63 | 700 | 1,000 | .78 | 535 | 500 | .60 |
| 12 | 1,060 | 2,100 | .68 | 770 | 1,240 | .78 | 560 | 520 | .55 |
| 13 | 1,140 | 2,500 | .75 | 830 | 1,700 | .73 | | | |

From an examination of the above table, the importance of changing the connections of the stator windings and simultaneously changing the rotor resistance is illustrated. For example, to obtain a speed of 590 R. P. M. with the part windings connected in parallel in each phase 900 watts are required and the power factor at that speed is .39. By connecting the stator windings in series a speed of 590 R. P. M. may be obtained with the expenditure of only 740 watts, a net savings of 160 watts, and at the same time a greatly improved power factor is obtained, namely, a power factor of .77, and furthermore, only a fractional part of the ohmic resistance is required.

Figure 2 of the drawings illustrates a second embodiment of the invention wherein the stator of a wound rotor induction motor is arranged to be connected either in delta or in star, while the resistance in the rotor circuit is simultaneously being changed.

The motor illustrated in Figure 2 is a three phase wound rotor induction motor having a stator S', a rotor R' and a variable resistor Z'. The stator S' is a three phase stator which is provided with coil parts 122, 123 and 124. These coil parts are arranged to be connected in such a manner that the stator is either a delta wound stator or a star wound stator. The coil parts are arranged to be connected as desired through the medium of a controller C'; which may be of any suitable variety well known to those skilled in the art, such as a cylindrical controller, in which a series of conductor bars are mounted and arranged to be engaged by a series of sliding contactor shoes through a series of different positions.

Each end of each coil part 122, 123 and 124 is connected to an associated contactor shoe on the controller C'. More particularly, coil part 122 has its opposite ends connected to contactor shoes 127 and 130; coil part 123 has its opposite ends connected to contactor shoes 125 and 128; and, coil part 124 has its opposite ends connected to contactor shoes 126 and 129.

The rotor R' is shown as comprising three windings 131, 132 and 133, connected in star. It is to be understood, however, that the rotor windings may be connected in any other manner, such as connected in delta, without departing from the spirit and scope of the invention. The rotor R' is connected through slip rings 134, 135 and 136 to a resistance unit for variable resistor Z'. This resistor Z' has three resistance elements 137, 138 and 139, which are connected together at one end by conductor 140. Resistance elements 138 and 139 are connected as shown, with slip rings 135 and 136. Resistance element 137, however, is connected to a contactor shoe 142 on controller C'; while slip ring 134 is connected to a contactor shoe 141 on controller C'. The slip ring end of resistance element 137 is also connected to a contactor shoe 157. The slip ring ends of resistance elements 138 and 139 are connected to contactor shoes 156 and 155, respectively. Four intermediate points 158, 159, 160 and 161 on resistance element 137 are connected respectively to contactor shoes 145, 148, 151 and 154 on controller C'. Four intermediate points 162, 163, 164 and 165 on resistance element 138 are connected respectively to contactor shoes 144, 147, 150 and 153 on controller C'. Four intermediate points 166, 167, 168 and 169 on resistance element 139 are connected respectively to contactor shoes 143, 146, 149 and 152 on controller C'.

Three phase power is supplied to the motor through conductors 170, 171 and 172 which are connected respectively to contactor shoes 173, 174 and 175 on controller C'.

The controller C' and the arrangement of the conductor bars thereon which are arranged to be engaged by the contactor shoes above referred to will now be described. The controller C' as shown, is a controller having ten positions as indicated by the broken lines, and whose positions are indicated by the Roman numerals. Three conductor bars 176, 177 and 178 are provided for progressive engagement with the contactor shoes 173, 174 and 175, respectively. It will be observed that the conductor bars 176, 177 and 178, which are associated with the source of power, extend across all ten positions of the controller C'. Another group of conductor bars 179, 180 and 181, which are positioned to be engaged by contactor shoes 125, 126 and 127, also extend across all ten positions of the controller C'. These contactor bars 179, 180 and 181 are connected by cross connections 182, 183 and 184 to contactor bars 176, 177 and 178.

Means for connecting the coils parts 122, 123 and 124 of stator S' in star is provided by three conductor bars 185, 186 and 187, which are connected together by cross connections 188 and 189. It will be observed that the bars 186 and 187 extend across only the first two positions of the controller C' and for that reason it will be understood that the stator S' is connected in star only in the first two positions of the controller C'. Three additional conductor bars 190, 191 and 192 are also arranged to be engaged by the same contactor shoes, 128, 129 and 130, as were bars 185, 186 and 187. The bars 190, 191 and 192 extend across positions III to X of the controller C'. A cross connection 193 between bars 180 and 192, a cross connection 194 between bars 179 and 191, and a cross connection 195 between bars 181 and 190 cause the stator S' to be connected in delta when the controller C' is in any one of its last eight positions.

The rotor is arranged to have one phase opened in the first position of the controller C' and to cause varying amounts of resistance to be placed in the rotor circuit through each of the succeeding positions of the controller C'. To this end, seventeen contactor bars 196 to 212, inclusive, are provided on the controller C', and are arranged to extend across the positions as indicated in Figure 2. The first two bars of this group, namely bars 196 and 197, are the bars which determine whether the rotor has one phase opened or not, and are arranged to be engaged by contactor shoes 141 and 142. The bars 196 and 197 are connected together by a cross connection 213. The remaining bars 198 to 212, inclusive, are arranged to be engaged by contactor shoes 143 to 157, respectively, and are all connected together by cross connections 214 to 227, as shown.

From the above description it will be apparent that when the controller is moved to its first position, the stator S' is connected in star and the rotor has one phase opened while resistance is connected in the remaining portion of the rotor circuit. When the controller C' is moved to position II, the stator S' is still connected in star, but the rotor is now connected for three phase operation and all of the resistance of the variable resistor Z' is connected in the circuit of the rotor R'. When the controller C' is moved to position III, the stator is switched from a star arrangement to a delta arrangement and the rotor which is now operating as a three phase rotor still has all of the resistance of variable resistance unit Z' connected in its circuit.

When the controller C' is moved to position IV, the stator is still connected in delta but a portion of the resistance which was in the rotor circuit has now been shorted out by contactor bars 198, 199 and 200, moving into engagement with contactor shoes 143, 144 and 145. As each succeeding position of the controller C' is reached, additional resistance is shorted out of the rotor circuit until position X is reached, at which time all of the resistance is shorted out.

While no illustrated example by way of a table is given for this embodiment of the invention, it will be apparent to those skilled in the art that equivalent beneficial results may be obtained with the arrangement shown in Figure 2.

While I have shown particular embodiments of my invention, it will, of course, be understood that I do not wish to be limited thereto, since many modifications may be made, and I, therefore, contemplate by the appended claim to cover all such modifications as fall within the true spirit and scope of my invention.

I claim as my invention:

In a motor control system, the combination comprising a motor having a poly-phase stator with at least two part windings in each phase, and a poly-phase wound rotor, variable resistance means connected to said rotor and forming a rotor circuit, and a controller arranged to be selectively moved through a plurality of positions representing different motor speeds, said controller having means thereon for connecting the part windings in each stator phase in series throughout a first predetermined number of positions and then in parallel throughout a second predetermined number of positions, said controller also having means thereon for maintaining one phase of said rotor circuit open throughout a first part of said first predetermined number of positions while changing the resistance value for each position of said first part of said first predetermined number of positions, then connecting the rotor circuit for poly-phase operation throughout the remaining positions and varying the resistance in the rotor circuit in a predetermined manner for each said remaining positions.

ERNST L. SCHWARZ.